July 13, 1943.   F. D. BUTLER   2,323,894
VALVES
Filed July 20, 1942   2 Sheets-Sheet 1
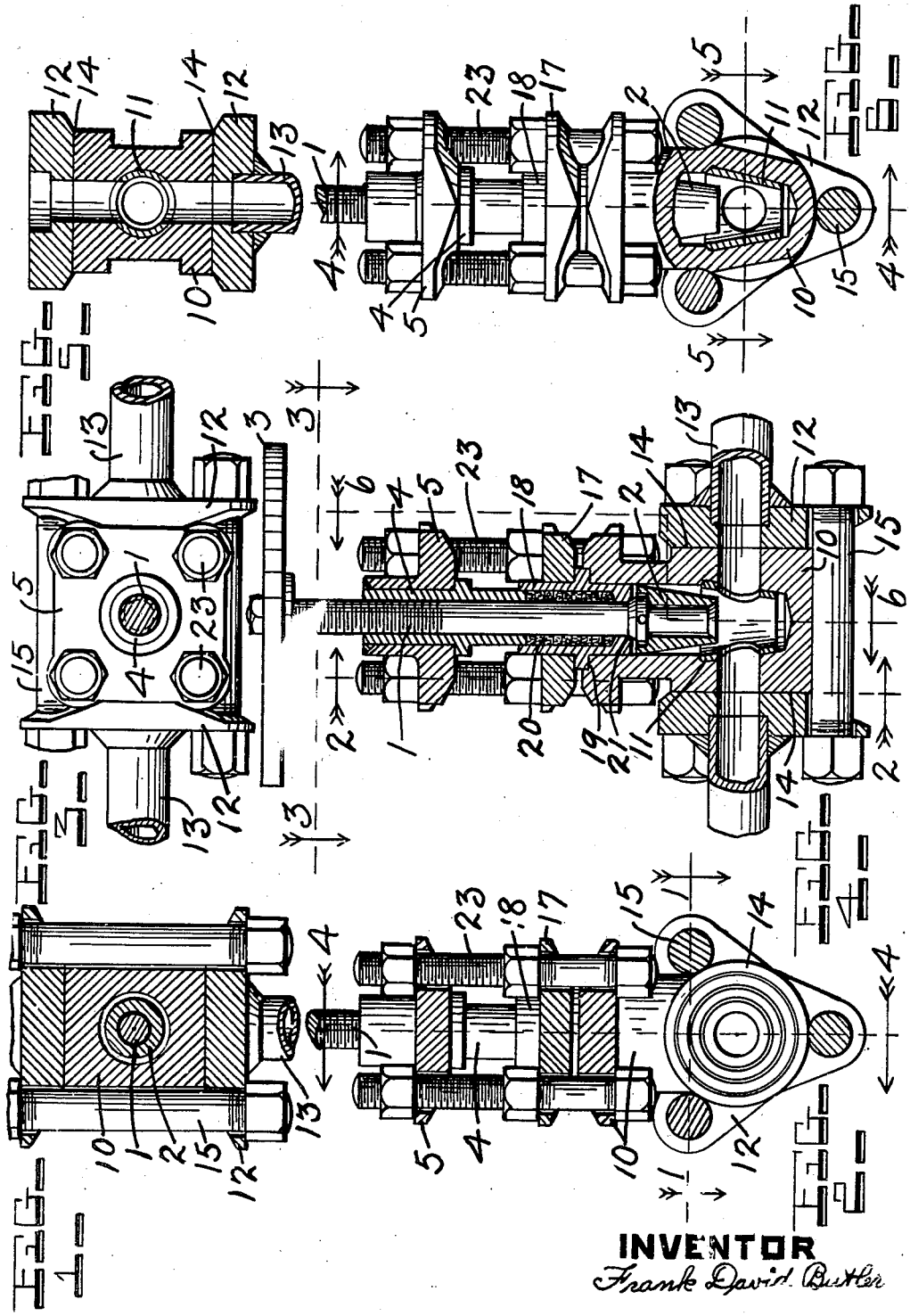
INVENTOR
Frank David Butler

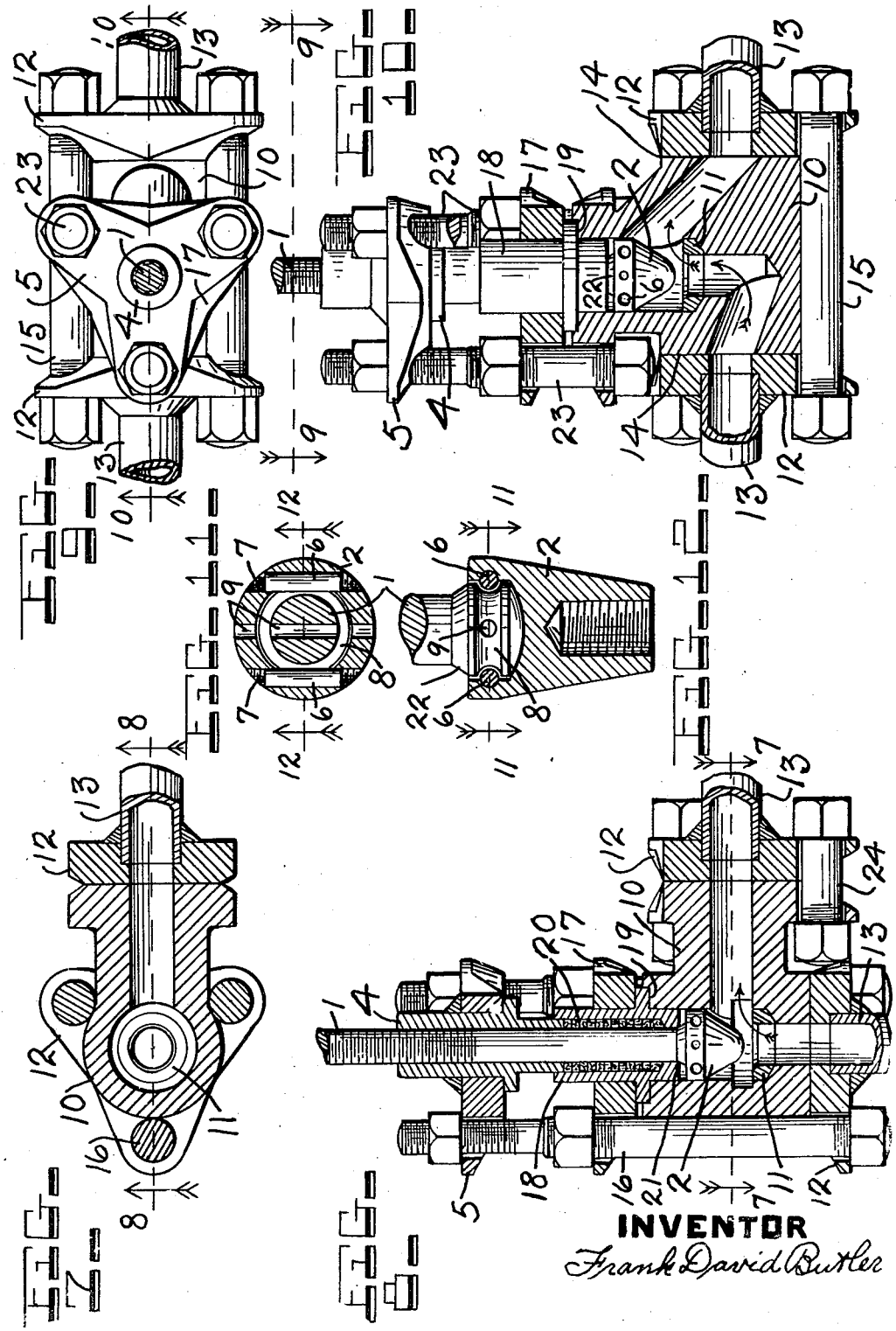

Patented July 13, 1943

2,323,894

UNITED STATES PATENT OFFICE 2,323,894

VALVE

Frank David Butler, United States Navy

Application July 20, 1942, Serial No. 451,653

3 Claims. (Cl. 251—155)

(Granted under the act of March 3, 1883, as amended April 30, 1928; 370 O. G. 757)

While my invention relates in general to valves, it applies more specifically to extremely high pressure pipe line stop valves wherein such pipe lines are equipped with flanges. In such high pressure flanged pipe lines I provide either flangeless, conically shaped lift disc type gate valves, or, conically shaped disc globe valves which are short coupled and can be conveniently secured between the flanges of said pipe lines with through extending stud-bolts, and wherein such valves are equipped with combined valve stem yoke sleeves and packing glands. I provide further, in connection with said flanged pipe line, a semi-flanged angle valve wherein through extending stud-bolts simultaneously secure such valve to one of the flanges of said pipe line, the valve bonnet to the valve body, and the combined valve stem yoke sleeve and packing-gland adjustable to said valve body. My invention makes it possible to short couple the valves in the pipe line and consequently greatly reduces the weight and size of the valves, especially in extremely high pressure types of valves.

With reference to the figures, Fig. 1 is a sectional view through my conically shaped gate valve as it would appear on the dotted line 1—1 of Fig. 2; The latter figure is as would appear on the dotted line 2—2 of Fig. 4; Fig. 3 is a plan view as would appear on the dotted line 3—3 of Fig. 4; The latter figure is a longitudinal section through the valve assembly as would appear on the dotted lines 4—4 of Figs. 2 and 6; Fig. 5 is a sectional view on the dotted line 5—5 of Fig. 6; The latter figure is as would appear on the dotted line 6—6 of Fig. 4; Fig. 7 is a sectional view of my close coupled angle valve as would appear on the dotted line 7—7 of Fig. 8; Fig. 8 is a longitudinal sectional view on the dotted line 8—8 of Fig. 7; Fig. 9 is a plan view of my close coupled globe valve as taken on the dotted line 9—9 of Fig. 10; The latter figure is partly a longitudinal sectional view as would appear on the dotted line 10—10 of Fig. 9; Fig. 11 is an enlarged view of either one of the conically shaped valves as used in the valves Figs. 1 to 6 inclusive, or, it could be one of the valve discs of either the angle or globe valves mentioned, and is a sectional view as it would appear on the dotted line 11—11 of Fig. 12; And, the latter figure is a longitudinal sectional view of one of the conically shaped gate valve discs as it would appear on the dotted line 12—12 of Fig. 11.

In the accompanying drawings all of the valve assemblies illustrated are especially adaptable for use in connection with extremely high pressure and temperature expansive fluid, and in the several views similar numerals indicate similar parts, the numeral 1 indicates the valve stem which should normally be manufactured of a non-galling corrosion resisting steel, and should have secured to its lower end the preferably hard grade of corrosion resisting alloy steel valve disc 2 and to its upper end the valve operating hand wheel 3. The upper end of the valve stem 1 is threaded into the upper half only of the non-galling bronze combined yoke bushing and packing gland 4 which latter is a shouldered press fit into the forged steel yoke flange 5 and is brazed or welded to the latter at a location opposite to the shouldered end. The conically shaped valve disc 2 is preferably secured to stem 1 in a manner as illustrated in Figs. 11 and 12 wherein two corrosion resisting steel dowel pins 6 are driven into the partly threaded holes 7 in disc 2 and then their ends are upset into such thread so as to prevent such pins from becoming loose. These pins 6 pass through the semi-circular groove 8 in stem 1 and thus secure the disc 2 to such stem in a manner in which the latter may be rotated independent of the former. A hole 9 extending through both the stem 1 and valve disc 2 is provided for means of inserting a driver pin while grinding in disc 2 to its seat.

The valve body 10 is preferably manufactured of forged carbon molybdenum steel, is of short coupled flangeless or semi-flangeless construction and is equipped with a hard surfaced alloy steel metal valve disc seat 11. This seat 11 may be applied to within the valve body 10 by building up with a hard grade of steel similar to Stellite, or, may be made of a hard grade of steel alloy and shrunk or rolled into the valve body 10. The steel tubing 13 forming the pipe line should normally be of the seamless carbon molybdenum type arc welded into the pipe or tubing flanges 12, and three through stud-bolts 15 should be used to secure the valve body 10 (having the grooved end faces 14) tightly between the flanges 12. The valve body 10 differs from the bodies of prior types of valves in that in my cone disc type of gate and globe valves (Figs. 1 to 6 and 9 and 10 inclusive, and, respectively) there are no flanges in the run of the valves. While in my cone disc type angle valve (Figs. 7 and 8 inclusive), three through extension type stud-bolts 16 simultaneously secure one of such pipe flanges 12 against one of the grooved end faces 14 of the valve body 10, the valve bonnet flange 17 and valve bonnet 18 against the opposite end face of such valve body, and the valve yoke flange 5 (containing gland 4) adjustable to the valve body 10. The valve bonnet 18 is a loose and shouldered fit in the bonnet flange 17, is a shouldered and ground fit in the recess 19 of valve body 10, contains the valve stem packing 20, has a conical valve seat 21 at its lower end (seat 21 coinciding with tapering valve surface 22 on valve stem 1), is preferably made of a non-galling corrosion resisting steel, and is adapted (at its upper end) to receive the combined gland and yoke bushing or sleeve 4.

The extension stud-bolts 23, in the gate and globe valves, simultaneously secure the bonnet flange 17 and bonnet 18 to the valve body 10, and the valve stem yoke flange 5 (containing gland 4) adjustable to the valve body 10. Machine bolts 24 being used in the angle valve (Figs. 7 and 8) to secure the outlet side of valve body 10 to the adjacent pipe tubing flange 12.

When valves of my type are used in connection with high temperature steam, the nuts on the through stud-bolts 15 and 16 should preferably be tightened while the pipe line is cold, then as the pressure is applied and the temperature of the valve rises the tendency of the through bolts will be to tighten the flanges 12 against the end surfaces 14 of the valve body 10 due to the fact that the temperature of the latter will always be higher than the temperature of the bolts.

To remove the valve body 10 (Figs. 1 to 6 and 9 and 10 inclusive) from between the pipe flanges 12, the nuts on all three stud-bolts 15 must be slightly loosened, and then after one of the upper of these stud-bolts are removed from between the flanges 12 the valve may be removed.

Normally it would be more convenient to tighten up on the packing gland 4 (bearing against packing 20) while the valve disc 2 is away from its seat 11, however the gland 4 may be tightened while valve disc 2 is closed by simultaneously tightening up on the upper nuts on extension stud-bolts 16 or 23 as such valve is being slightly lifted from its seat.

When valves of this type are to be used for low pressure salt water service, then the valve seat 11 and valve body 10 should normally be integral and made of either Monel metal or a brass composition, the bonnet flange 17 and bonnet 18 should be integral and made of either Monel metal or a brass composition, and the combined gland and yoke bushing 4 should be integral with yoke flange 5 and should be made of a non-galling bronze composition.

The conical, lift plug disc gate valve, Figs. 1 to 6 inclusive, having a valve disc similar to that illustrated in Figs. 11 and 12 is a unique and radical departure from the prior common type of gate valve, and with its conically shaped valve seat makes it adaptable to extremely high pressures without danger of bulging under such pressure.

It is understood that slight changes may be made in the means disclosed without digressing from the invention concept.

The invention described herein may be manufactured and/or used by or for the Government of the United States of America for governmental purposes without the payment of any royalty.

Having thus set forth and disclosed the nature of this invention, what I claim and desire to secure by Letters Patent is:

1. In a pressure line stop angle valve for use in connection with a flanged pressure pipe line and having a flanged bonnet with a partly threaded valve stem extending through a packing or stuffing box in said bonnet, the combination therewith of a main body portion having no flange opposite said bonnet end and constructed to be secured between said flanged bonnet and one of the flanges of said flanged pressure pipe line with a plurality of (preferably three) elongated stud-bolts which latter extend beyond said flanged bonnet and form a means of supporting a combined partly threaded yoke and packing gland for said valve stem and a means of adjusting said gland either towards or away from said stuffing box.

2. In either a globe or gate close coupled pressure line stop valve having a valve bonnet and being for use in connection with a flanged pressure line, a main body portion having no flanges in the run of said pressure line and constructed to be secured in the latter between two of said flanges by three elongated stud-bolts which latter are equally spaced concentric to said two flanges and extend beyond the latter, one of said stud-bolts being located directly opposite to said bonnet, an access passage extending from the center of one of said flanges through said main body portion and to the center of the other of said two flanges, an elongated conically shaped valve disc located and fitted to be valve seated approximately midway in said main body portion and constructed to close off said access passage when so seated, and externally operated means for seating and unseating said conically shaped valve disc.

3. In a gate type pressure line stop valve having a bonnet and being for use in connection with a flanged pressure line subjected to extremely high pressures and temperatures, means for close coupling said valve in said pressure line consisting of, a main body portion of such valve having no flanges in the run of said pressure line but being constructed to be secured in the latter between two of the flanges thereof by three elongated stud-bolts which latter are equally spaced concentric to said two flanges and extend beyond the latter, one of said stud-bolts being located directly opposite to said bonnet, an access passage extending concentrically with the run of such pressure line directly through said main body portion, an elongated conically shaped gate valve disc located and fitted to be valve seated approximately midway in the length of said access passage in said main body portion and constructed to close off said access passage when so seated and to fully open said access passage when fully unseated, and externally operated means for seating and fully unseating said gate valve disc.

FRANK DAVID BUTLER.